United States Patent
Lang et al.

(10) Patent No.: US 12,368,520 B2
(45) Date of Patent: Jul. 22, 2025

(54) METHOD FOR DETERMINING A NONLINEARITY CHARACTERISTIC OF A RECEIVER PATH AND RF DEVICE

(71) Applicant: Infineon Technologies AG, Neubiberg (DE)

(72) Inventors: Oliver Lang, Linz (AT); Matthias Wagner, Engerwitzdorf (AT); Esmaeil Kavousi Ghafi, Linz (AT); Andreas Schwarz, Öpping (AT)

(73) Assignee: Infineon Technologies AG, Neubiberg (DE)

( * ) Notice: Subject to any disclaimer, the term of this patent is extended or adjusted under 35 U.S.C. 154(b) by 106 days.

(21) Appl. No.: 18/483,997

(22) Filed: Oct. 10, 2023

(65) Prior Publication Data
US 2024/0137135 A1    Apr. 25, 2024

(30) Foreign Application Priority Data
Oct. 18, 2022   (DE) .......................... 102022210964.3

(51) Int. Cl.
H04B 17/13    (2015.01)
H04B 17/14    (2015.01)
H04B 17/20    (2015.01)

(52) U.S. Cl.
CPC ............ *H04B 17/13* (2015.01); *H04B 17/14* (2015.01); *H04B 17/201* (2023.05)

(58) Field of Classification Search
CPC ....... H04B 17/13; H04B 17/14; H04B 17/201
See application file for complete search history.

(56) References Cited

U.S. PATENT DOCUMENTS

| | | | | |
|---|---|---|---|---|
| 5,051,916 A | * | 9/1991 | Benson ................... | G01R 23/16 702/76 |
| 8,255,183 B1 | * | 8/2012 | Husted ................... | H04B 17/14 702/117 |
| 2008/0182537 A1 | * | 7/2008 | Manku ..................... | H04B 1/12 455/226.1 |
| 2015/0032788 A1 | * | 1/2015 | Velazquez ............... | H04L 25/14 708/819 |
| 2016/0197684 A1 | * | 7/2016 | Tsai ........................ | H04B 17/29 455/67.14 |
| 2018/0172801 A1 | * | 6/2018 | Schrattenecker ...... | G01S 7/4021 |
| 2021/0055377 A1 | * | 2/2021 | Itkin ........................ | H03H 7/38 |

(Continued)

FOREIGN PATENT DOCUMENTS

| | | |
|---|---|---|
| DE | 102017127416 A1 | 6/2018 |
| DE | 102020121458 A1 | 2/2021 |

*Primary Examiner* — Jaison Joseph
(74) *Attorney, Agent, or Firm* — Harrity & Harrity, LLP

(57) ABSTRACT

A method for determining a nonlinearity characteristic of a receiver path includes generating a set of N×M digital samples by repeating N times selecting an scaling factor from a set of N scaling factors, generating a version of a test signal, the version of the test signal corresponding to a test signal scaled by the respective scaling factor, processing the respective version of the test signal in at least a part of the receiver path to generate a respective processed signal, and storing M digital samples corresponding to the respective processed signal. Fourier-transformed data are generated using at least a portion of the set of N×M digital samples and a nonlinearity characteristic of the receiver path is determined based on the Fourier-transformed data.

20 Claims, 8 Drawing Sheets

(56) References Cited

U.S. PATENT DOCUMENTS

| | | | |
|---|---|---|---|
| 2023/0014179 A1* | 1/2023 | Wagner | G01S 7/356 |
| 2023/0163866 A1* | 5/2023 | Choi | H04B 17/12 |
| | | | 455/115.3 |
| 2023/0231568 A1* | 7/2023 | Wagner | H03M 1/0626 |
| | | | 341/120 |
| 2024/0137135 A1* | 4/2024 | Lang | H04B 17/201 |
| 2024/0364433 A1* | 10/2024 | Yang | H04B 17/203 |
| 2025/0087338 A1* | 3/2025 | Kagan | G16H 30/40 |

* cited by examiner

METHOD FOR DETERMINING A NONLINEARITY CHARACTERISTIC OF A RECEIVER PATH AND RF DEVICE

CROSS-REFERENCE TO RELATED APPLICATION

This application claims priority to German Patent Application No. 102022210964.3 filed on Oct. 18, 2022, the content of which is incorporated by reference herein in its entirety.

TECHNICAL FIELD

The present disclosure relates to determining a nonlinear characteristic of an RF receiver path.

BACKGROUND

In many RF applications, on-chip monitoring is of great importance or even required by the application. On-chip monitoring is a testing of the device when the device is in an operational state, e.g., during an operation or between two operations, using on-chip test signal generators. One example for on-chip monitoring are radar sensors used in automotive applications which have to fulfill strict functional-safety requirements. As of today, on-chip monitoring of RF devices in the field of radar sensors for autonomous driving applications typically covers gain, phase, noise figure and phase-noise tests. However, monitoring concepts for the linearity of radar receivers have not been implemented. In the future, due to the increasing number of radar sensors in automotive applications, monitoring requirements may include monitoring new parameters such as a receiver nonlinearity. A major challenge of on-chip monitoring on monolithic microwave integrated circuits (MMICs) are the hardware limitations, e.g., restricted chip area, the components process variation and test circuit imperfections. Specifically, in the context of linearity monitoring, the test signal generator (TSG) has to meet higher linearity specifications than the device under test (DUT). However, as a consequence of the limited chip area, state-of-the-art TSGs might entail low resolution digital-to-analog converters (DACs). This results in higher quantization noise, which heavily impedes the use of common on-chip test circuitry for linearity monitoring. Additionally, the TSG itself might inherit a nonlinear behavior. Thus, the DUT nonlinearity cannot be identified separately.

Therefore a need exists to provide a concept which allows determining a nonlinearity characteristic on-chip using chip-area efficient test signal generators.

SUMMARY

A method for determining a nonlinearity characteristic of a receiver path includes generating a set of N×M digital samples by repeating N times selecting an scaling factor from a set of N scaling factors, generating a version of a test signal, the version of the test signal corresponding to a test signal scaled by the respective scaling factor, processing the respective version of the test signal in at least a part of the receiver path to generate a respective processed signal, and storing M digital samples corresponding to the respective processed signal. Fourier-transformed data are generated using at least a portion of the set of N×M digital samples and a nonlinearity characteristic of the receiver path is determined based on the Fourier-transformed data.

An RF device includes a receiver path and circuitry for determining a nonlinearity characteristic of the receiver path. The circuitry includes a test circuit configured to generate a set of N×M digital samples by repeating N times selecting an scaling factor from a set of N scaling factors, generating a version of a test signal, the version of the test signal corresponding to a test signal scaled by the respective scaling factor, processing the respective version of the test signal in at least a part of the receiver path to generate a respective processed signal, and storing M digital samples corresponding to the respective processed signal. An evaluation circuit is configured to generate Fourier-transformed data using at least a portion of the set of N×M digital samples and to determine a nonlinearity characteristic of the receiver path based on the Fourier-transformed data.

Those skilled in the art will recognize additional features and advantages upon reading the following detailed description, and upon viewing the accompanying drawings.

BRIEF DESCRIPTION OF THE DRAWINGS

The present disclosure is illustrated by way of example, and not by way of limitation, in the figures of the accompanying drawings in which like reference numerals refer to similar or identical elements. The elements of the drawings are not necessarily to scale relative to each other. The features of the various illustrated examples can be combined unless they exclude each other.

DETAILED DESCRIPTION

The examples described herein provide a new concept for determining a nonlinear characteristic of a receiver path. The new concept uses versions of a test signal which are scaled with different scaling factors rather than providing a single test signal for determining nonlinearity characteristics.

The described concept allows to overcome the challenges for providing on-chip monitoring in RF devices (such as monolithic microwave integrated circuits (MMICs)) to determine the presence of nonlinearity characteristics in a receiver path. Specifically, the disclosed implementations allow to relax the requirements for test signal generator (TSG) to have a high linearity and to produce test signals that include pure spectral test tones. Determining of nonlinearity characteristics of a receiver path allows to conclude on the linearity of a receiver path. Determining nonlinearity characteristics and linearity testing are therefore used herein interchangeable. Typically, a receiver is consider to be linear if one or more nonlinearity characteristics such as a third order intercept point (IP3) or a spurious free dynamic range (SFDR) are within a specified range.

Figure 1:
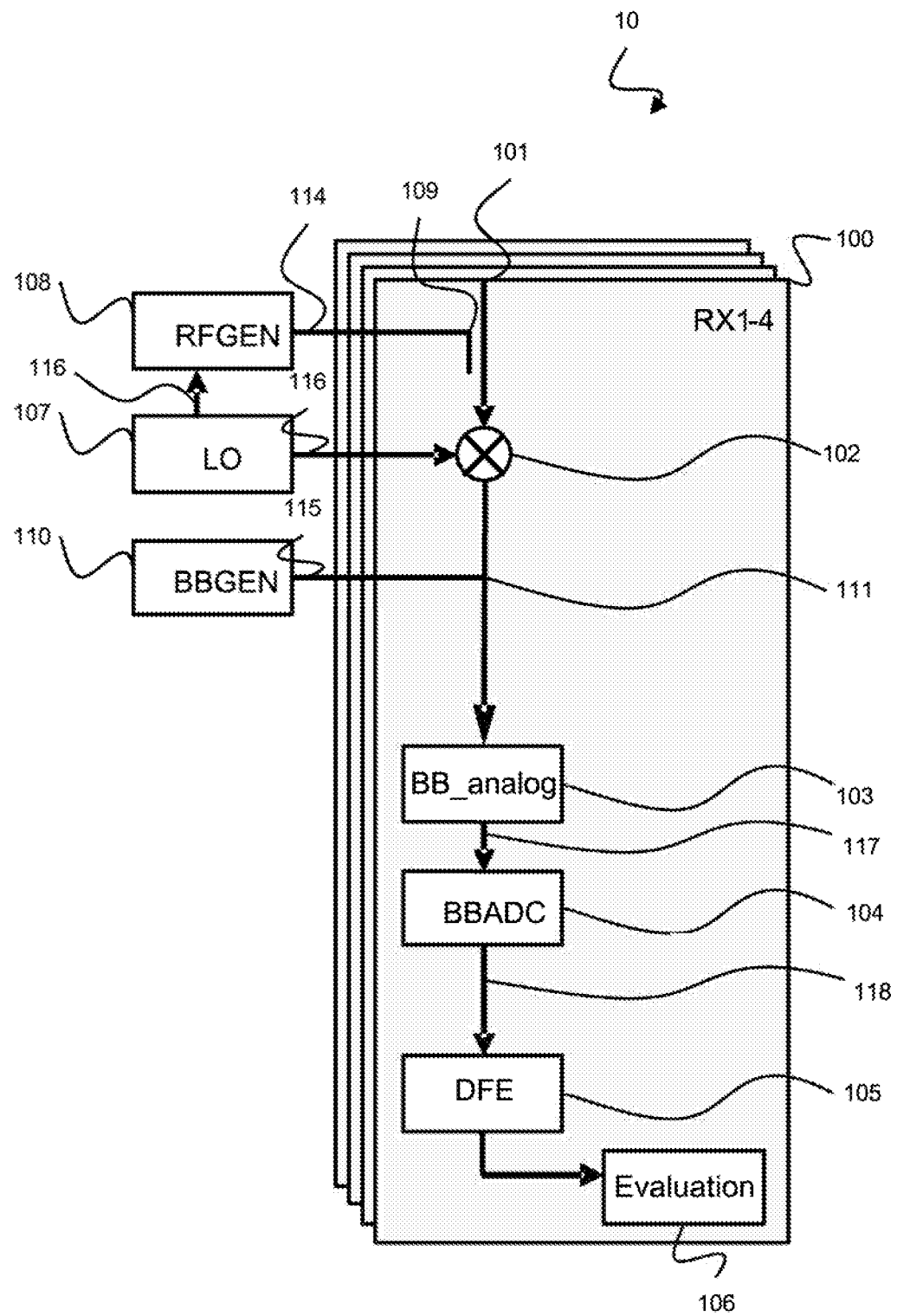
FIG. 1 illustrates a block diagram of a receiver according to an example.

Referring to FIG. 1, an example of an RF receiver 10 including circuitry for on-chip monitoring will be described.

All elements of the RF receiver 10 may be implemented on a single semiconductor chip or within one semiconductor package. In some examples the RF receiver 10 may be a Radar receiver such as a Radar FMCW receiver. The RF receiver 10 may be in some examples the receiver part of a transceiver.

The RF receiver 10 includes an RF receiver path 100 (sometimes referred to as receiver channel) connectable via an input 101 to an antenna. As can be seen in FIG. 1, three other RF receiver paths are provided in addition to the RF receiver path 100 in order to form a plurality of RF receiver paths RX1-4. Multiple RF receiver paths 100 allow parallel processing of signals received at multiple antennas for example to enable MIMO operation. In examples described herein, the RF receiver paths 100 are of similar structure and function and therefore only the RF receiver path 100 will be explained in detail. However, in other examples the receiver paths may vary in structure or function or both.

An RF mixer 102 is provided to down-convert RF signals into baseband signals. A first input of the RF mixer 102 is connected to the input 101. A second input of the RF mixer 102 is coupled to an output of a local oscillator 107. The local oscillator 107 is configured to generate RF local oscillator signals 116 provided to the RF mixer 102. In some examples, the RF local oscillator signals 116 are in the range between 10 and 100 GHz, although the present disclosure is not limited thereto.

The baseband signal is processed in an analog baseband circuit 103 including for example analog filters, low-noise amplifiers etc. Processed baseband signals 117 are output from the analog baseband circuit 103 and provided to an analog-to-digital converter 104 to generate a stream of digital receiver samples 118 representing the processed baseband monitoring signal 117.

The analog-to-digital converter 104 is coupled to a digital front-end circuit 105 which provides digital front-end processing to the processed baseband monitoring signal. An evaluation circuit 106 is provided in order to provide evaluation of the signals received from the digital front-end circuit 105. In a monitoring operation, the evaluation circuit 106 provides evaluation of the processed test signals for example in order to determine a correct operation or a failure of the RF receiver path 100 according to the receiver specification.

A first on-chip test signal generator 108 for generating RF monitoring signals is coupled upstream of the RF mixer 102 to the RF receiver path 100. The first on-chip test signal generator 108 is configured to generate an RF monitoring signal 114. The RF monitoring signal 114 is coupled into the RF receiver path 100 via an RF coupler 109 to monitor the RF part and the baseband part of the RF receiver path 100. RF coupler 109 may include for example a directional RF coupler. After coupling into the RF receiver path 100, the RF monitoring signal 114 is processed by the RF receiver path 100 as described above.

In order to generate the RF monitoring signal 114, the first on-chip test signal generator 108 is coupled to the local oscillator 107. Furthermore, the RF test signal generator 108 may be configured to generate a digital test signal represented by a stream of digital test samples which is converted to an analog signal and modulated onto the local oscillator signal. In some examples, the RF test signal generator 108 may include a phase shifter or I-Q modulator in order to provide modulation of the local oscillator signal. The test signal modulated onto the RF local oscillator signal 116 may have one or more tones in the baseband frequency range of the RF receiver path 100. In some examples, to generate the stream of digital test samples, the monitoring circuit may include a direct digital synthesizer (DDS) allowing generating arbitrary waveforms or multi-tone signals for the digital test signal.

The monitoring circuit further includes a second on-chip test signal generator 110 to generate a baseband monitoring signal 115. The baseband monitoring signal 115 is coupled at a node 111 into the analog baseband circuit 103 to provide monitoring of the baseband part of the RF receiver path 100. Similar to the RF monitoring, the baseband monitoring signal 115 may be generated based on a stream of digital test samples provided by a direct digital synthesizer. The digital test samples may be provided to a digital-to-analog converter (DAC) prior to the coupling into the baseband part of the RF receiver path 100. In some example, the digital test samples for the RF monitoring and the digital test samples for the baseband monitoring may be provided by a same digital signal generator.

A major challenge of on-chip monitoring on RF devices such as monolithic microwave integrated circuits (MMICs) are the hardware limitations, e.g., restricted chip area, the components process variation and test circuit imperfections. In some systems, linearity monitoring requires that the test signal generators (TSG) meet higher linearity specifications than the device under test (DUT), e.g., the RF receiver path 100. However, as a consequence of the limited chip area, state-of-the-art test signal generators entail low resolution digital-to-analog converters (DACs). This results in higher quantization noise, which heavily impedes the use of common on-chip test circuitry for linearity monitoring. Additionally, the test signal generator itself might inherit a nonlinear behavior. Thus, the DUT nonlinearity cannot be identified separately.

Figure 2:
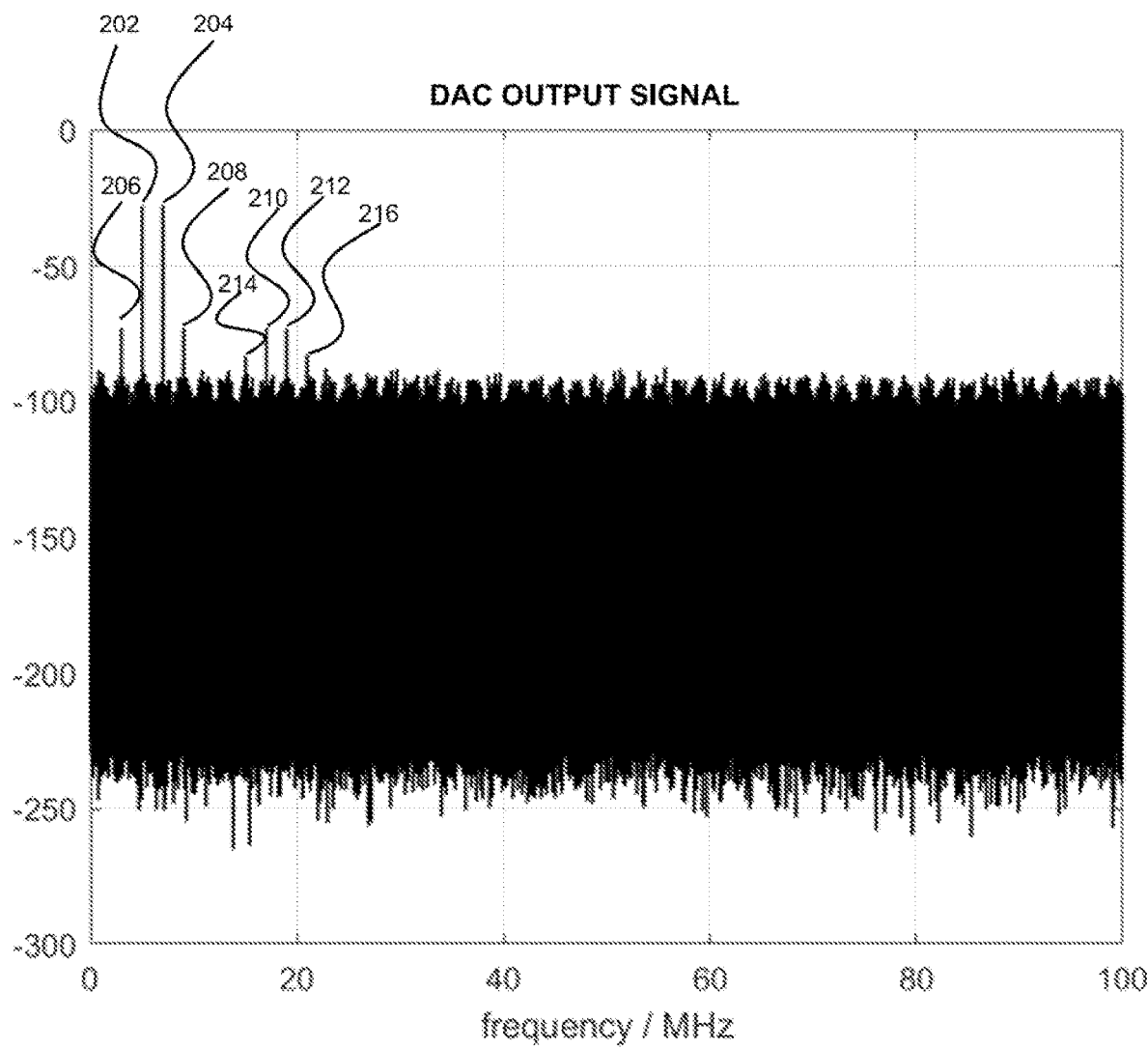
FIG. 2 illustrates an output signal of a test signal generator after digital-to-analog conversion.

In FIG. 2 shows an example output spectrum of a test signal provided by a 6 bit DAC. The use of a 6 bit DAC allows a chip-area effective and cost-effective implementation of the test signal generator compared to the usage of DACs with higher bit resolution but this results in an integral nonlinearity within the test signal generation. The desired test signal output by such a chip-area effective test signal generator includes a first tone 202 with frequency at 5 MHz and a second tone 204 with frequency at 7 MHz. As can be seen, the ideal test signal output is superimposed by high power quantization noise, intermodulation products 206, 208 and harmonics 210, 212 which mask the DUT nonlinearity as will be explained later. Conventional test systems are not capable of using such test signals for testing linearity of a receiver path.

To achieve on-chip monitoring, built-in test circuits may be provided which are capable of providing two-tone test signals. A major design challenge of these BIST structures is the generation of a spectrally pure two-tone test signal. In the past, this was mainly solved by sophisticated analog design of the test signal source, which increased the complexity of the test circuitry and increased chip size and manufacturing costs.

Figure 3:
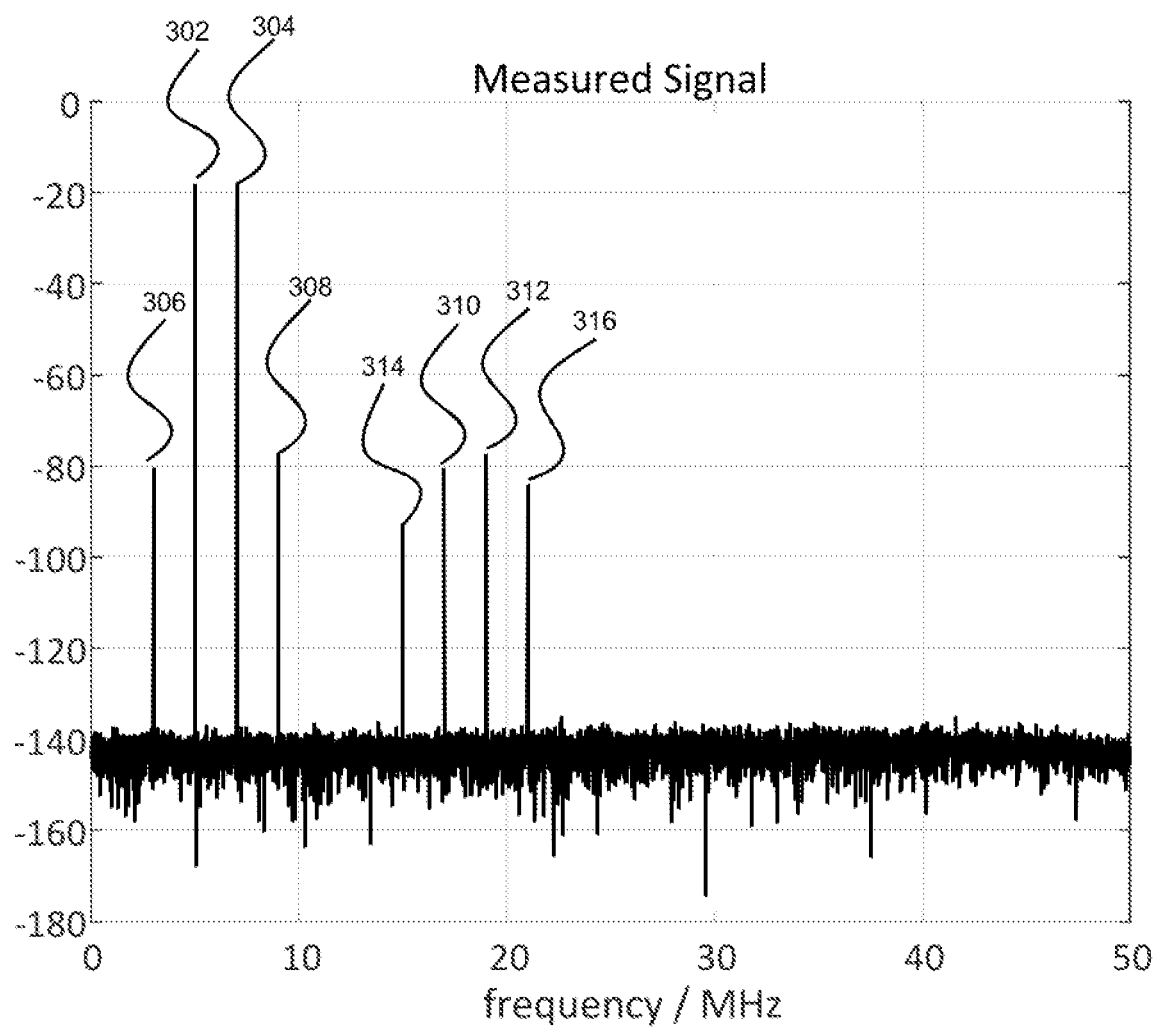
FIG. 3 illustrates a spectral output of a nonlinear system.

FIG. 3 shows a spectral measurement of an output signal of a nonlinear system (e.g., a nonlinear receiver path) which receives as input a two-tone test signal with a high spectral purity. As may be observed, a first desired tone 302 at 5 MHz and a second desired tone 304 at 7 MHz are superimposed with a first intermodulation product 306 at 3 MHz and a second intermodulation product 308 at 9 MHz and harmonics at 15 MHz, 17 MHz, 19 MHz and 21 MHz. From this, the degree of nonlinearity can be specified for example in terms of an third order intercept point (IP3) or a spurious free dynamic range (SFDR).

The IP3 is a typical characteristic for nonlinear systems, such as amplifiers etc. Considering the Taylor expansion of a nonlinear system f(x) with $$f(x) = \alpha_1 x + \alpha_2 x^2 + \alpha_3 x^3 + \alpha_4 x^4 + \ldots,$$

and feeding a sinusoidal signal $$x(t) = \hat{x} \cos(\omega t)$$

into the system, one can observe an output signal with additional frequency components compared to the input signal. For the IP3 the third order nonlinearity is assumed to be the dominating effect such that the output may be written as $$y(t) = (\alpha_1 \hat{x} - \tfrac{3}{4}\alpha_3 \hat{x}^3)\cos(\omega t) - \tfrac{1}{4}\alpha_3 \hat{x}^3 \cos(3\omega t),$$

with $\alpha_3 > 0$. The input IP3 (IIP3) is now defined as the input level such that $$\alpha_1 \hat{x} = \tfrac{3}{4}\alpha_3 \hat{x}^3.$$

In conventional practice a two-tone test signal as shown in FIG. 3 is used, and the output IP3 (OIP3) is determined by comparing the power levels at the fundamental tones (in FIG. 2. at 5 MHz and 7 MHz) P1 with the power levels of the intermodulation products (in FIG. 2. at 3 MHz and 9 MHz) P3. It can be shown that the OIP3 is given with $$OIP3 = P1 + \tfrac{1}{2}(P1 - P3).$$

The spurious free dynamic range (SFDR) is another figure of merit, which is mostly used to specify the nonlinearity of digital-to-analog converters (DACs) or analog-to-digital converters (ADCs). The SFDR is defined as the ratio of the maximum signal component at the input of the system and the next largest noise or harmonic distortion component at the system output.

While on-chip linearity monitoring has so far been realized at the cost of high complexity of the test circuitry, increased chip size and increased manufacturing expenses, monitoring concepts for determining the linearity RF receiver paths capable of realizing an on-chip linearity monitoring with chip-area effective test signal generators are not existing so far. Furthermore, specifically in automotive radar receivers where in addition to the need of chip-area effective solutions also high standards for testing are required due to their usage in traffic, linearity testing has not been realized on-chip so far in products.

In the following, a new concept will be described which allows using on-chip test signal generators for linearity monitoring that are less complex and more chip area efficient than conventional on-chip test signal generators. For example, the new concept allows the test signal generator to be inherently nonlinear (e.g., to generate a test signal with a spectrum similar or identical to the spectrum shown in FIG. 2) or to use non-pure tones in the test signal spectrum or other non-ideal test signals.

The described concept uses scaled versions of a test signal in combination with an new evaluation of harmonics which enables a highly precise on-chip linearity testing using a low area-consuming TSG.

To achieve the determining of nonlinearity characteristics, all impairments originating from the test signal generation are separated from the system nonlinearity. Without an accurate generation of the test signal, this can be achieved by exploiting the test signal generators high repeatability (the same signal can be generated when repeating). Instead of injecting a highly precise test signal into the DUT, an imprecise test signal is injected multiple times. Each time the signal is however modified, e.g., by scaling the test signal in the analog domain. Scaling of the test signal can be achieved for example in the analog domain by using resistor networks or in a digital domain using respective digital processing. Scaling of the test signal with a particular scaling factor is a linear amplitude scaling of the of the test signal. In other words, the modified test signal is obtained α by αx(t) with α being the scaling factor and x(t) the non-modified test signal output by the test signal generator. In implementations, the scaling factors are selected to be equal to or less than 1 (attenuation). Attenuating the test signals rather than amplifying allows for using passive circuit elements for providing the attenuation. Distinguished from active circuit elements, passive circuit elements have a significant better linearity and introduce no or less additional nonlinearity characteristics to the test signals. All impairments affecting the test signal before the modification (e.g., nonlinearity of the signal generator) can be separated from nonlinear effects after the modification (e.g., the nonlinearity effects of the receiver path to be tested) by digital signal processing as will be described below.

Consider the test signal x(t), which might contain non-ideal effects of the test signal generation, e.g., DAC quantization error or an integral nonlinearity of the DAC. This test signal is consecutively generated for N times. Each time x(t) is scaled with a specific scaling factor before the test signal is fed into the DUT. In other words, versions of the test signal are generated wherein each version of the test signal corresponds to the same test signal scaled by the respective scaling factor selected from a set of scaling factors. In some implementations, the scaling is provided by attenuating the test signal after the test signal has been generated. This separation from the actual generation of the test signals allows that the scaling is accurate and not affected by nonlinearity characteristic of the test signal generator. In other words, the test signal generator always provides the same unscaled version of the test signal which is then afterwards scaled for example by attenuating the test signal.

In view of the above, the full test signal may be written as $$x_T(n, t) = \cos\left(\frac{2\pi}{N}n\right) x(t) \qquad (1)$$

with the scaling factor $$\cos\left(\frac{2\pi}{N}n\right)$$

and n=0(1)N−1 (from 0 to N−1 with steps 1).

Note that, the index n refers to the actual number how often the test signal has been generated, thus it can be interpreted as a slow-time index. The index n is 0 for the first time of test signal generation with 1 being added to n each time the test signal is repeatedly generated and modified with a new scaling factor. The time index t corresponds to the time within one generation of the test signal and will therefore be referred to as fast time. The nonlinearity of the DUT affects not only the fast-time part of the signal x(t), but also the slow-time part $$\cos\left(\frac{2\pi}{N}n\right).$$

Consequently, harmonics of $$\cos\left(\frac{2\pi}{N}n\right)$$

will appear, which can be separated by well-known methods of signal processing, e.g., a Fast Fourier Transformation (FFT). Fast Fourier Transformation may include real FFTs, complex FFTs, the use of Goertzel-Filter or other discrete Fourier Transformation.

In the following, this concept is explained using an example.
Let a. $f(x) = \alpha_1 x + \alpha_2 x^2 + \alpha_3 x^3$ (2)

be the input-output behavior of a DUT with real valued coefficients $\alpha_i$, where i=1, 2, 3. Inserting the test signal from (1) into (2) yields the system output b. $y(n, t) = \alpha_1 \cos\left(\frac{2\pi}{N}n\right) x(t) + \alpha_2 \cos\left(\frac{2\pi}{N}n\right)^2 x^2(t) + \alpha_3 \cos\left(\frac{2\pi}{N}n\right)^3 x^3(t).$ (3)

By the use of simple trigonometric identities, the expression above may be rearranged as $$y(n, t) = \left[\frac{1}{2}\alpha_2 x^2(t)\right] 1 + \left[\alpha_1 x(t) + \frac{3}{4}\alpha_3 x^3(t)\right] \cos\left(\frac{2\pi}{N}n\right) + \left[\frac{1}{2}\alpha_2 x^2\right]\cos\left(\frac{4\pi}{N}n\right) + \left[\frac{1}{4}\alpha_3 x^3(t)\right]\cos\left(\frac{6\pi}{N}n\right).$$ (4)

In (4) it can be observed that, the expressions in squared parentheses contain only fast-time terms, e.g., x(t), $x^2(t)$ and $x^3(t)$. Furthermore, the expressions in parentheses are weighted by sinusoids of different frequencies depending on the slow-time index n. Computing an FFT along slow time (along the index n) results in a separation of the expressions in squared parenthesis. The FFT along the slow-time may for example correspond to $$F(u, t) = \sum_{n=0}^{N-1} \exp\left(-i\frac{2\pi nu}{N}\right) y(n, t).$$

Other FFTs along the slow time may be used for separation of the expressions, for example real-valued FFTs using sine-functions $$F(u, t) = \sum_{n=0}^{N-1} \sin\left(\frac{2\pi nu}{N}\right) y(n, t)$$

or cosine-functions $$F(u, t) = \sum_{n=0}^{N-1} \cos\left(\frac{2\pi nu}{N}\right) y(n, t).$$

In a last step, the system nonlinearity may be specified using theses expressions for example by comparing the expressions. For example, the ratio of $[\alpha_1 x(t) + \frac{3}{4}\alpha_3 x^3(t)]$ and $[\frac{1}{4}\alpha_3 x^3(t)]$ can be used to identify the third order input intercept point. It should be mentioned that, this concept eliminates the need of a precisely known test signal, because x(t) and $x^3(t)$ are separately available at the systems output. Thus, these values may be compared to each other without any specific knowledge of the waveform of x(t). It is to be noticed that in a digital time-discrete domain, x(t) is replaced by a set of digital samples x(m) with m=0(1)M−1 (from 0 to M−1 with steps 1). The FFT along the slow-time axis corresponds then for example to $$F(u, m) = \sum_{n=0}^{N-1} \exp\left(-i\frac{2\pi nu}{N}\right) y(n, m).$$

As described above, in implementations the FFT may be a real-valued FFT. Furthermore, in order to obtain a spectral representation for the evaluation, a second FFT along the m-indices (fast-time) may be provided by generating digital samples $$Z(u, v) = \sum_{m=0}^{M-1} \exp\left(-i\frac{2\pi mv}{M}\right) F(u, m).$$

It is to be noted that Z(u,v,) corresponds to a two-dimensional Fourier-Transformation of the set of digital samples y(n, m). The order of the first and second Fourier-Transformation can be exchanged since Fourier-Transformation are linear operations.

In one implementation, the integer number N is chosen to be 6 which allows determining the nonlinearity characteristics highly precise at a minimum number of repetitions. Accordingly, the test signal is consecutively generated six times in the example described below. However it is to be understood that other numbers of N, e.g., greater than 6 can be used.

Therefore, the full test signal may be written as

1. $x_T(n, t) = \cos\left(\frac{\pi}{3}n\right) x(t),$ (5)

with the scaling factor $$\cos\left(\frac{\pi}{3}n\right)$$

and n=0(1)5. Note that, the integer index n refers to the actual number of test signal generation starting from 0 to 5 in steps of 1. Furthermore, instead of a cosine function some implementations may use a sine function or other harmonic functions. The time index t corresponds to the time within one generation of the test signal e.g., the fast time.

Let again the input-output behavior of a DUT be assumed by i. $f(x) = \alpha_1 x + \alpha_2 x^2 + \alpha_3 x^3$ (6)

with real valued coefficients $\alpha_i$, where i=1, 2, 3. Inserting the test signal from (1) into (2) yields the system output 2. $y(n, t) = \alpha_1 \cos\left(\frac{\pi}{3}n\right) x(t) + \alpha_2 \cos\left(\frac{\pi}{3}n\right)^2 x^2(t) + \alpha_3 \cos\left(\frac{\pi}{3}n\right)^3 x^3(t).$ (7)

The expression above may be rearranged as $$y(n, t) = \left[\frac{1}{2}\alpha_2 x^2(t)\right]1 + \left[\alpha_1 x(t) + \frac{3}{4}\alpha_3 x^3(t)\right] \qquad (8)$$
$$\cos\left(\frac{\pi}{3}n\right) + \left[\frac{1}{2}\alpha_2 x^2\right]\cos\left(\frac{2\pi}{3}n\right) + \left[\frac{1}{4}\alpha_3 x^3(t)\right]\cos(\pi n).$$

Similar to (4), it can observed in (8) that, the expressions in squared parentheses contain only fast-time terms, e.g., $x(t)$, $x^2(t)$ and $x^3(t)$. The expressions in parentheses are weighted by sinusoids of different frequencies depending on the slow-time index n. Computing a DFT (Discrete Fourier Transformation) along slow time (along n-indices) results in a separation of the expressions in squared parenthesis. In a last step, the systems nonlinearity may be specified by comparing these expressions. For example, the ratio of $[\alpha_1 x(t)+\frac{3}{4}\alpha_3 x^3(t)]$ and $[\frac{1}{4}\alpha_3 x^3(t)]$ can be used to identify the third order input intercept point. It should be highlighted that, this concept eliminates the need of a precisely known test signal, because $x(t)$ and $x^3(t)$ are separately available at the systems output. Thus, these values may be compared to each other without any specific knowledge of the waveform of $x(t)$. As described above, a spectral representation can be generated by a DFT along the m-indices (fast time).

Figure 4:
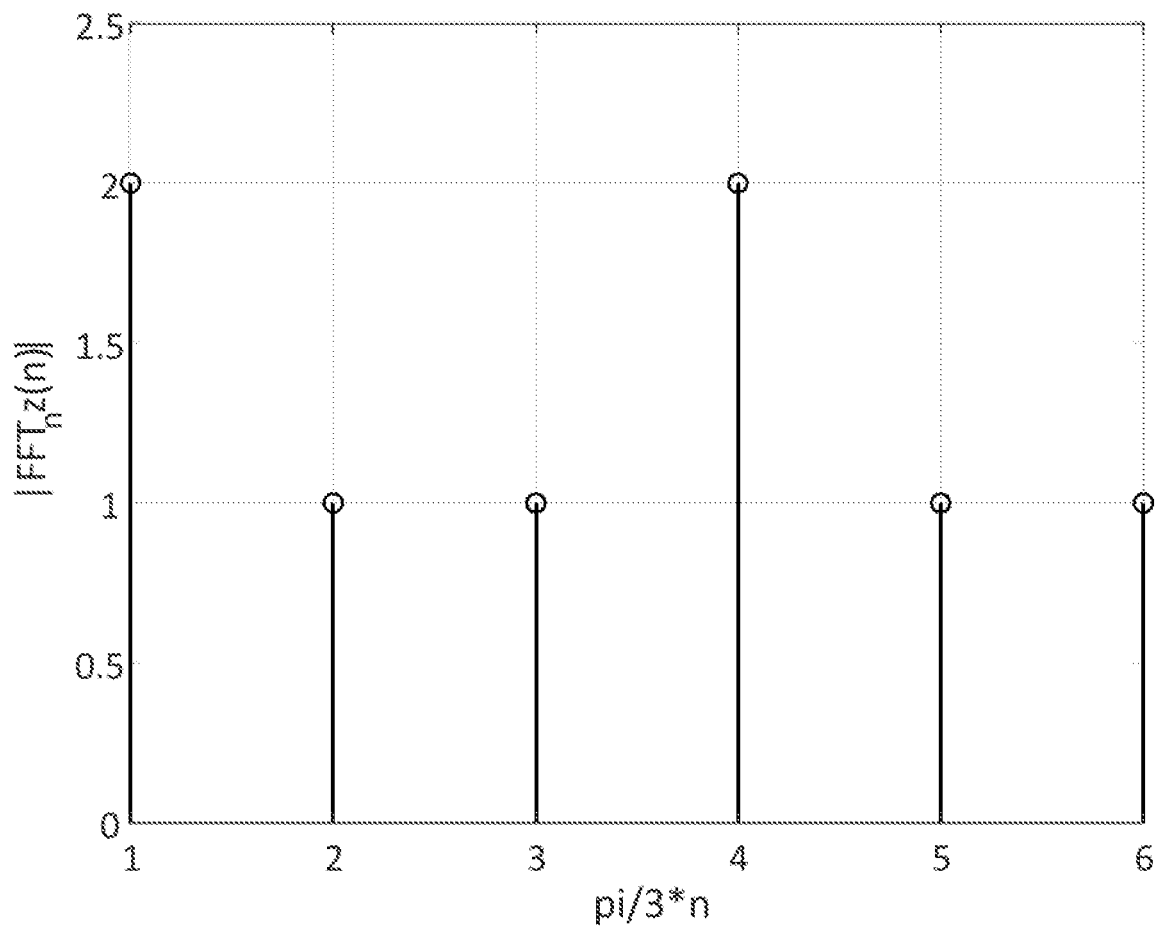
FIG. 4 illustrates a result of a Fourier-transformation of a toy signal.

The symmetry of an DFT spectrum of a real valued signal shows an advantage of injecting the test signal exactly six times. In the following figure, the DFT of a toy signal $$z(n) = 1 + \cos\left(\frac{\pi}{3}n\right) + \cos\left(\frac{2\pi}{3}n\right) + \cos(\pi n),$$

is illustrated in FIG. 4. Note that, the frequencies match the ones from the example above and that the DC (n=0) component and the third harmonic (n=3) show twice the expected amplitude because of aliasing. Therefore, an DFT length of six (which corresponds to injecting a respective version of the test signal six times) is a minimum possible DFT length before inextricable aliasing occurs.

The proposed concept is a general concept for enabling linearity monitoring with a low-quality TSG. Therefore, a variety of implementations are possible. For the sake of simplicity, one specific implementation will be explained in detail, with many modifications possible. Some possible modifications will be listed further below.

Consider a nonlinear system $$i. \ f(x(t)) = \alpha_1 x(t) + \alpha_3 (x(t) * h_{HPF}(t))^3 \qquad (9)$$

with $\alpha_1$ describing the gain of the system and $\alpha_3$ modeling a third order saturation effect. Note that in order to show that the concept can be used for any kind of nonlinearity (e.g., nonlinearity that is frequency-dependent), the input signal $x(t)$ is convoluted with a high pass filter with impulse response $h_{HPF}(t)$, before the input signal $x(t)$ is taken to the power of three. This corresponds to a frequency-dependent nonlinearity of the DUT as high frequencies experience more nonlinear distortion than low frequencies.

Furthermore, a two-tone signal is used as the test signal $x(t)$ from (1). Specifically, the test signal may be written as $$x(t)=A\cos(2\pi f_1 t)+A\cos(2\pi f_2 t), \ t\in[0,T]$$

with the frequencies $f_1$ and $f_2$, the amplitude A and the test signal duration T. This test signal is generated six times by a DAC with a low resolution and fed into a modulation block. As described in the previous section, this modulation block attenuates the signal according to the number of the test signal generation and may be written as $$i. \ x_T(n, t) = \cos\left(\frac{\pi}{3}n\right)(A\cos(2\pi f_1 t) + A\cos(2\pi f_2 t) + q(t) + \epsilon(t)), \qquad (10)$$
$$n = 0(1)5$$

where q(t) describes the quantization error and $\epsilon(t)$ as an arbitrary nonlinear distortion of $x(t)$. Injecting the test signal in (6) into (5) yields the system output $$y(n, t)=f(x_T(n, t)),$$

Which is analog to digital converted by an ADC, stored and rearranged into the matrix $$Y = \begin{bmatrix} y_1^T \\ y_2^T \\ \vdots \\ y_6^T \end{bmatrix},$$

with $y_n^T \in \mathbb{R}^{1\times M}$ being the sampled output signal (arranged as a vector) of the n-th test signal injection and M being the number of samples within one injection.

After the rearrangement a two-dimensional FFT of Y is computed resulting in the evaluation matrix $$Z = \begin{bmatrix} z_1^T \\ z_2^T \\ \vdots \\ z_6^T \end{bmatrix}.$$

As discussed in the previous section, typically the first four rows of Z are of interest for the evaluation, whereas the $5^{th}$ and the $6^{th}$ row contain no additional information. One can show that, the $1^{st}$ and the $3^{rd}$ row correspond to even order nonlinear effect. The $2^{nd}$ row represents the linear output of the system superimposed with odd order harmonics. It should be noted, that in practical cases the harmonics in this row may be neglectable, such that the second row shows the linear output of the system. Last, the 4th row contains only odd order harmonics. For some applications it might be sufficient to analyze only particular harmonics, e.g., the $1^{st}$ and the $3^{rd}$. In such examples, the FFT might for example be realized using a Goertzel filter which calculates Fourier-transformed data for the specified harmonics, e.g., $Z_1^T$ and $z_3^T$.

After calculating the Fourier-transformed data by Fourier-transforming along the n-indices (slow axis), a nonlinearity characteristic such as the IP3 or the SFDR can be evaluated using the Fourier-transformed data. In terms of the IP3 for example, the power level of the fundamental tones P1 (as explained previously) is extracted from the $2^{nd}$ row. This can be done by computing a fast-time FFT of the $2^{nd}$ row and extracting then the peak power at 5 MHz or 7 MHz. Note that if a 2D FFT is used, the fast-time FFT is already provided by the 2D FFT.

In the same manner the power of the intermodulation products can be evaluated by considering the $4^{th}$ row. Therefore, computing a fast-time FFT of the $4^{th}$ row and extracting the power level at 3 MHz or 9 MHz yields the intermodulation product power level (P3 from section 2). In the end the output IP3 is evaluated with $$OIP3=P1+\frac{1}{2}(P1-P3).$$

In terms of SFDR, a fast-time FFT is computed of all four rows. Next, the highest power level of the $2^{nd}$ row is compared to the highest power level of the other three rows, which directly yields the SFDR.

Figure 5:
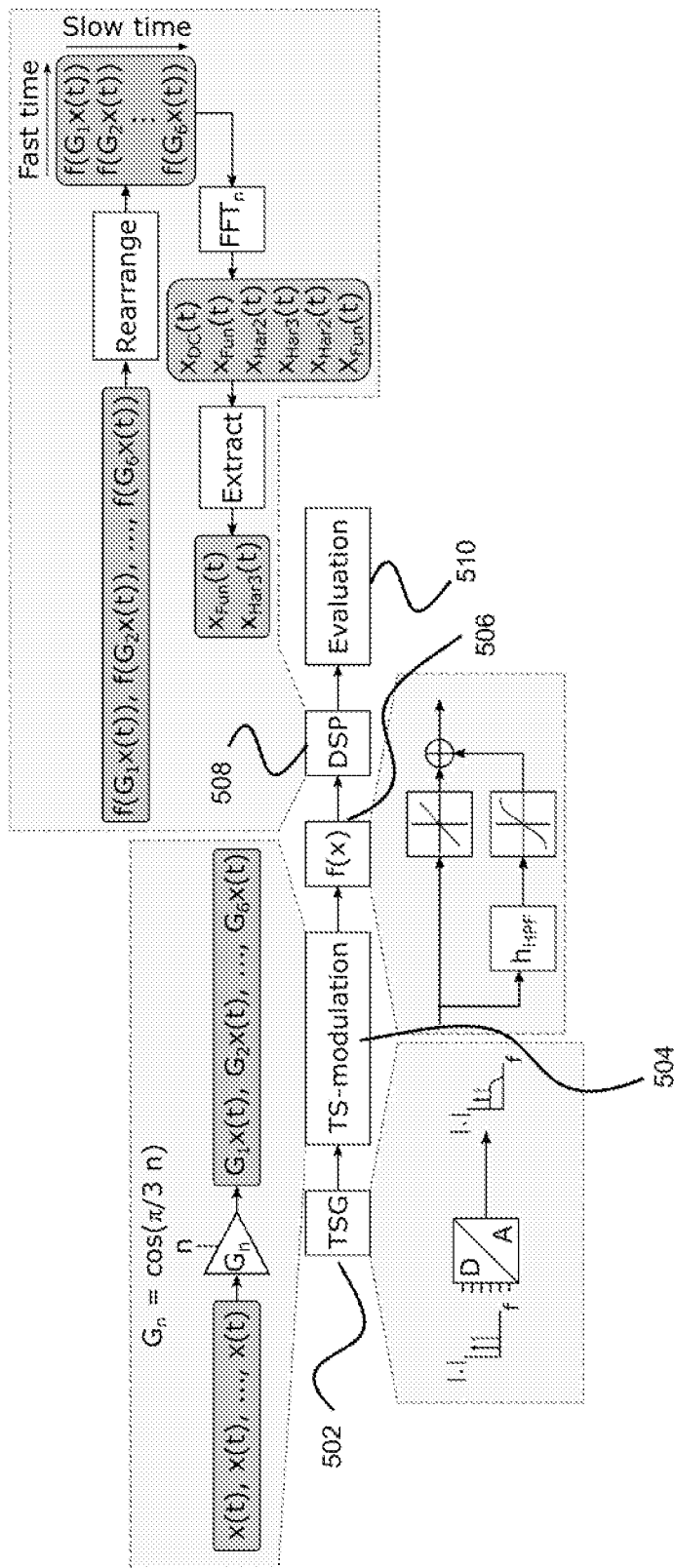
FIG. 5 illustrates a schematic block diagram according to an example.

A schematic block diagram of the concept is illustrated in FIG. 5. FIG. 5 shows the test signal generation in the TSG block 502. The test signal is attenuated in a TS-modulation block 504 and fed into the DUT 506 (e.g., the receiver path 100) which is modeled by a nonlinear function $f(x)$. The signal processed by the DUT is input to a DSP block which provides the rearrangement of the output signal to a matrix of N×M and the DFT along the indices n (slow time). The respective harmonics of the DFT result are extracted and provided to an evaluation block 510 to determine the nonlinearity characteristic as described above. It is to be noted that for determining the nonlinearity characteristics, a FFT along the indices m (fast time) may be performed to obtain the fast-time spectral content of each slow-time harmonic. If just one part of the system (linear, even harmonic, odd harmonic) is of interest, the slow-time FFT may be realized by a Goertzel filter which calculates only specific harmonics.

Figure 6:
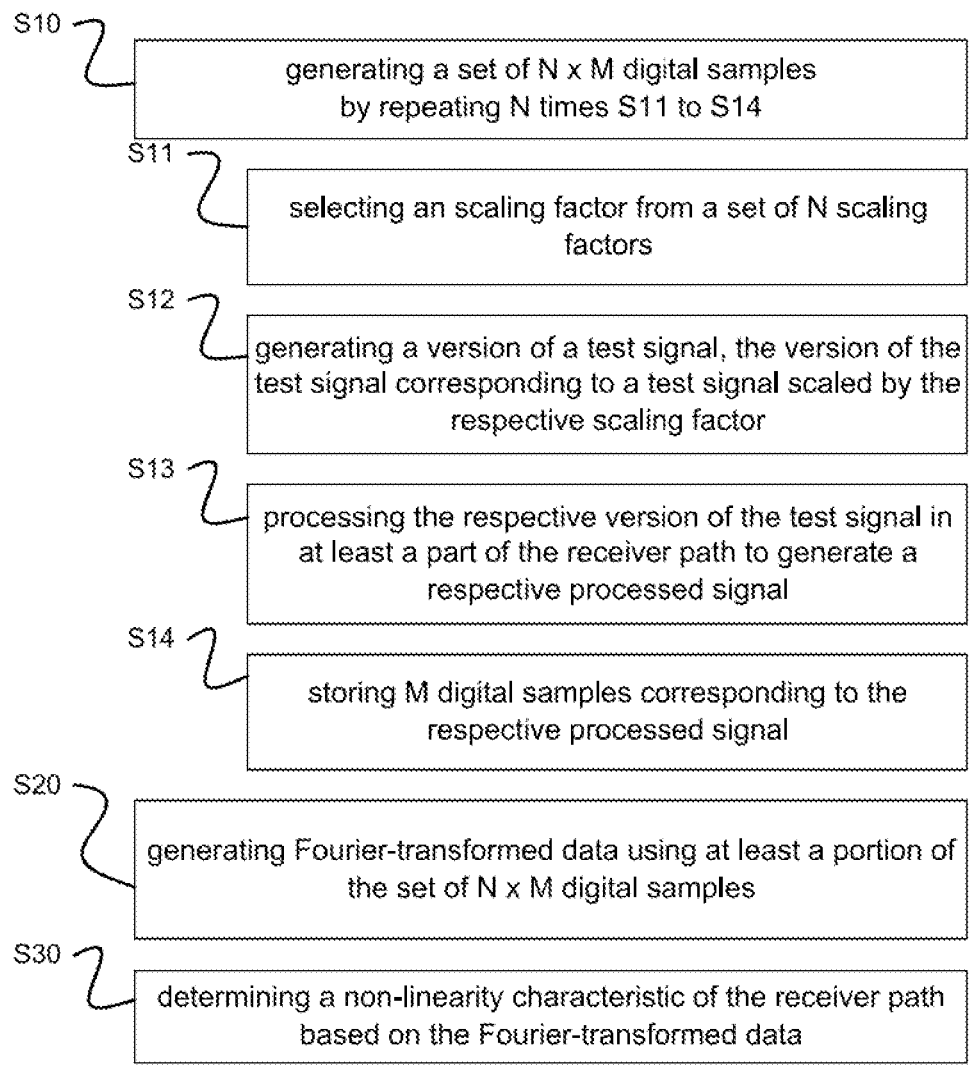
FIG. 6 illustrates a flow diagram according to an example.

A flow diagram of a method according to the concept is shown in FIG. 6. The method starts with a step S10 in which a set of N×M digital samples are generated by repeating N times the sub steps S11 to S14. In sub step S11, a scaling factor is selected from a set of N scaling factors and in sub step S12, a version of a test signal is generated such that the version of the test signal corresponds to a test signal scaled by the respective scaling factor. In sub step S13 the respective version of the test signal is processed in at least a part of the receiver path to generate a respective processed signal and in sub step S14 M digital samples corresponding to the respective processed signal are stored.

Figure 7:
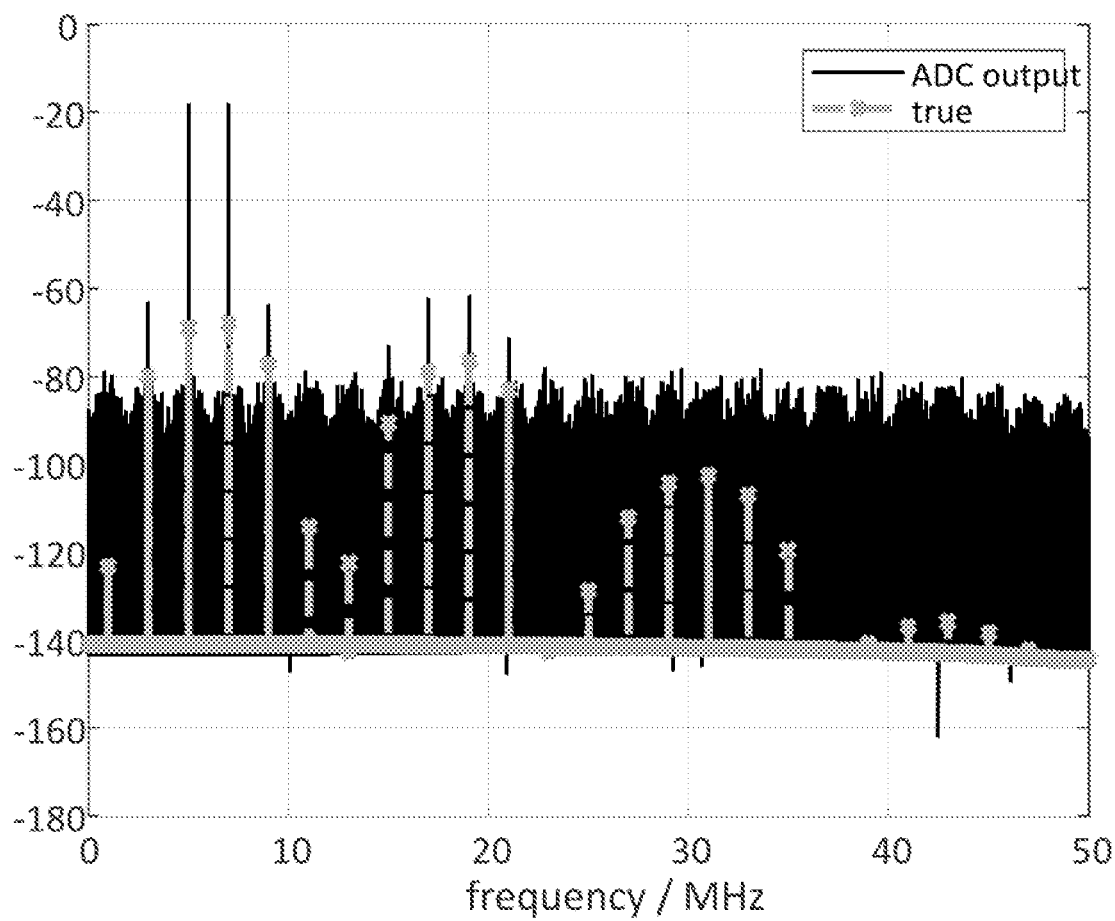
FIG. 7 illustrates a spectrum of a processed test signal after analog-to-digital conversion.
Figure 8:
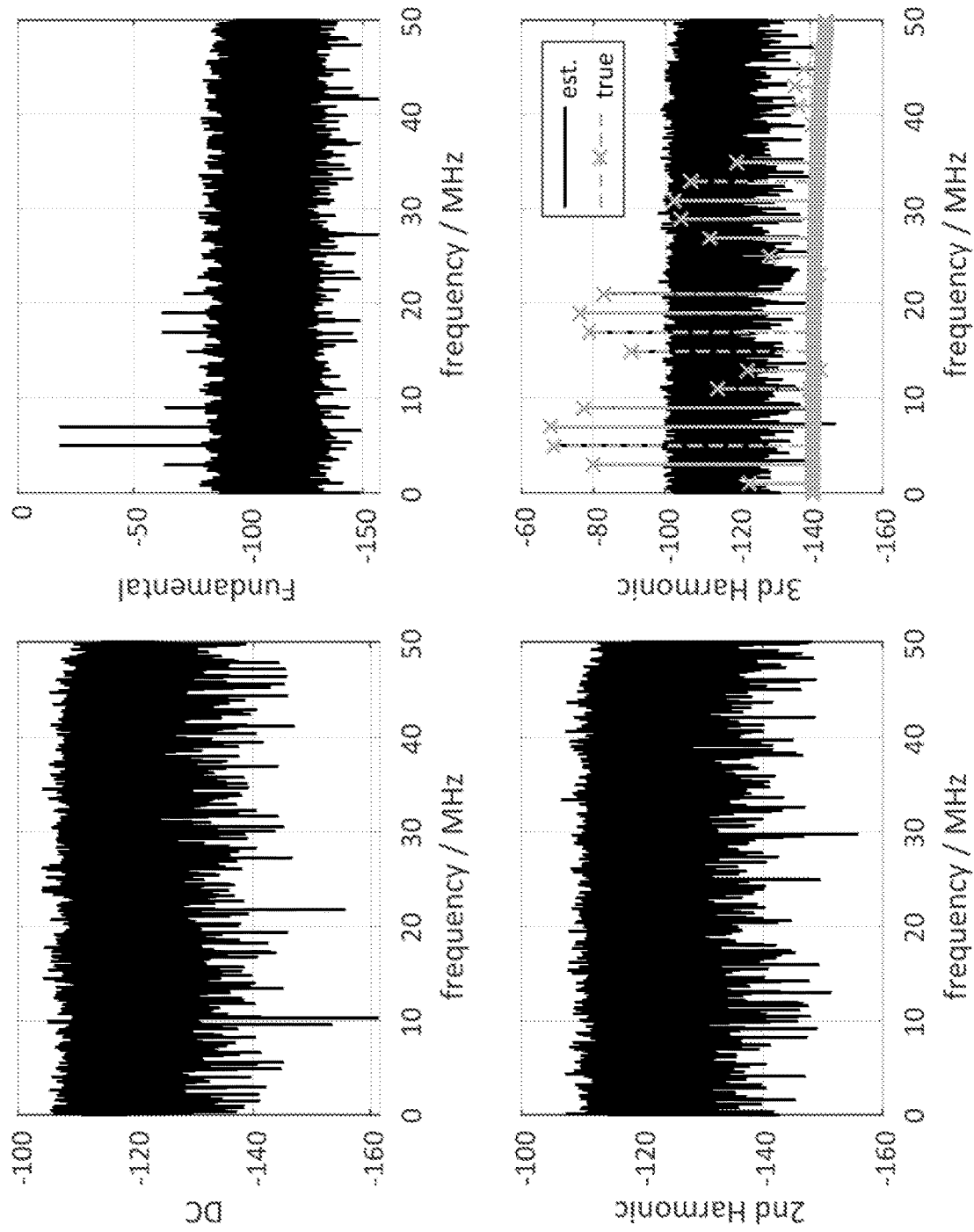
FIG. 8 illustrates spectral data of a processed test signal separated into different slow-time harmonics.

Referring now to FIGS. 7 and 8, simulation results are illustrated. Within these simulations a dual-tone at 5 MHz and 7 MHz with −22 dBm tone power was used as the test signal. This test signal was the quantized with a resolution of 6 bit and sent to a third order polynomial in order to model DAC quantization and DAC nonlinearity. Furthermore, the system under test has a gain of 10 dB and an 1 dB compression point of 10 dB at 5 MHz. The 1 dB compression point is stated at a specific frequency because the used high pass filter (shown in FIG. 5) yields a different nonlinear behavior for different frequencies. The simulation was conducted with 200 Mhz sampling frequency and a test signal length of approx. 3.3 μs.

Analyzing the spectrum of the ADC output signal in FIG. 7, one recognizes that the true system nonlinearity of the DUT (indicated in grey) is hidden within the DAC quantization noise and masked by the DAC nonlinearity making it for conventional monitoring systems not possible to determine the nonlinearity of the DUT. Applying the proposed concept, the different contributors of the system, e.g., linear part, harmonics, are separated as shown in FIG. 8.

FIG. 8 shows the fast-time spectral content Z(u,v) obtained after a two-dimensional Fourier-Transformation for the different slow-time harmonics u, e.g., DC (u=0), linear (u=1), second harmonic (u=2) and third harmonic (u=3). The top left and the bottom left plots of FIG. 8 showing the fast-time spectrum of the DC (top left) and the second slow-time harmonic (bottom left) induces that there is no even order harmonic included in the system nonlinearity. The top right plot shows the spectrum of the linear part (u=1) of the signal. The bottom right plot showing the third slow-time harmonic however reveals the systems nonlinearity. Note that, although the effects of any nonlinear behavior of the system was hidden by the TSG impairments, they are clearly visible in this plot and match the true nonlinearity (dashed grey line).

Using the fast-time spectral data corresponding to one or more respective slow-time harmonics, the nonlinear characteristic of the DUT such as the IP3 or SFDR can be calculated as described above. For some examples, only specific slow-time harmonics may be of interest and instead of a complete FFT calculation a Goertzel filter may be used. Consider for example the IP3 as the interesting figure of merit. Then the peak power of the fundamental tone (5 MHZ or 7 MHz in the example above) may be evaluated with a Goertzel filter. With a second Goertzel filter, the same can be done for the intermodulation product (3 MHz or 9 MHz in the example above). Evaluating and storing these two values for each test signal injection (six times) yields a 2×6 matrix. This allows to compute now a reduced DFT in slow time, which still yields all the information needed for the IIP3 evaluation (as explained above).

In view of the above it becomes clear that the described concept is capable of providing on-chip monitoring even when the TSG is implemented with low chip area and is inherent nonlinear. The described concept separates nonlinear effects before the scaling (attenuation, modulation) of the test signal from nonlinear effects after the modulation. Consequently, in a complex system with multiple components, the position of the scaling or injection of the test signal can be changed to cover different parts of the system.

Although specific examples have been illustrated and described herein, it will be appreciated by those of ordinary skill in the art that a variety of alternate and/or equivalent implementations may be substituted for the specific examples shown and described without departing from the scope of the present implementation.

For example, the described concept is not limited to a specific test signal waveform and many different test signal waveforms such as dual-tone, pseudo random noise, frequency ramps etc. can be used. Furthermore, the test signals may be real-value test signals or complex-value test signals resulting from an IQ-modulator. Furthermore, the concept can be applied to different systems under test or receiver parts under test such as BB-systems, RF-systems, or both RF and BB-systems. Furthermore different parameters and evaluation algorithms other than the described IP3 and SFDR can be used to determine the nonlinearity characteristic.

This application is intended to cover any adaptations or variations of the specific examples discussed herein. Therefore, it is intended that this implementation be limited only by the claims and the equivalents thereof.

It should be noted that the methods and devices including its implementations as outlined in the present document may be used stand-alone or in combination with the other methods and devices disclosed in this document. In addition, the features outlined in the context of a device are also applicable to a corresponding method, and vice versa. Furthermore, all aspects of the methods and devices outlined in the present document may be arbitrarily combined. In particular, the features of the claims may be combined with one another in an arbitrary manner.

Aspects

In the following, the present concept will be further described using specific aspects.

Aspect 1 is a method for determining a nonlinearity characteristic of a receiver path, the method comprising:

generating a set of N×M digital samples by repeating N times, selecting an scaling factor from a set of N scaling factors, generating a version of a test signal, the version of the test signal corresponding to a test signal scaled by the respective scaling factor, processing the respective version of the test signal in at least a part of the receiver path to generate a respective processed signal, storing M digital samples corresponding to the respective processed signal; generating Fourier-transformed data using at least a portion of the set of N×M digital samples; and determining a nonlinearity characteristic of the receiver path based on the Fourier-transformed data.

Aspect 2 is the method according to Aspect 1, wherein the test signal comprises a baseband tone or an RF signal.

Aspect 3 is the method according to anyone of Aspects 1 or 2, wherein each of the respective versions of the test signal is modulated onto an RF local oscillator signal and wherein the modulated RF local oscillator is injected into the receiver path.

Aspect 4 is the method according to anyone of Aspects 1 to 3, wherein the set of N scaling factors comprises only scaling factors equal to or less than 1.

Aspect 5 is the method according to anyone of Aspects 1 to 4, wherein the set of N scaling factors comprises the values $\cos((2\pi \times n)/N)$ where n is an integer number from 0 to N−1.

Aspect 6 is the method according to anyone of Aspects 1 to 5, wherein the set of N×M digital samples comprises the digital samples $Y(n,m)$ with n being an integer number from 0 to N−1 and m being an integer from 0 to M−1 and generating Fourier-transformed data comprises calculating Fourier-transformed samples by Fourier-transforming the set of digital samples $Y(n,m)$ along the n-indices.

Aspect 7 is the method according to anyone of Aspects 1 to 6, wherein the set of N×M digital samples comprises the digital samples $Y(n,m)$ with n being an integer number from 0 to N−1 and m being an integer from 0 to M−1 and generating Fourier-transformed data comprises calculating a two-dimensional Fourier-Transformation on the set of digital samples $Y(n,m)$.

Aspect 8 is the method according to anyone of Aspects 1 to 7, wherein determining the nonlinearity characteristic of the receiver path based on the Fourier-transformed data comprises determining peaks of the Fourier-transformed data.

Aspect 9 is the method according to Aspect 8, wherein determining the nonlinearity characteristic of the receiver path based on the Fourier-transformed data comprises determining peaks from a set of samples that corresponds to Fourier-transformed samples of an $u^{th}$ harmonic, where u is an integer greater than 1.

Aspect 10 is the method according to any of Aspects 1 to 9, wherein determining the nonlinearity characteristic of the receiver path comprises at least one of: determining a third order intercept point; determining a spurious free dynamic range; or determining a total harmonic distortion.

Aspect 11 is an RF device comprising: a receiver path; circuitry for determining a nonlinearity characteristic of the receiver path, the circuitry comprising: a test circuit, the test circuit configured to generate a set of N×M digital samples by repeating N times, selecting an scaling factor from a set of N scaling factors, generating a version of a test signal, the version of the test signal corresponding to a test signal scaled by the respective scaling factor, processing the respective version of the test signal in at least a part of the receiver path to generate a respective processed signal, storing M digital samples corresponding to the respective processed signal; an evaluation circuit, the evaluation circuit configured to generate Fourier-transformed data using at least a portion of the set of N×M digital samples and to determine a nonlinearity characteristic of the receiver path based on the Fourier-transformed data.

Aspect 12 is the RF device according to Aspect 11, wherein the test signal comprises at least one of a baseband tone or an RF signal.

Aspect 13 is the RF device according to Aspect 11, wherein the test circuit comprises a modulator and wherein the test circuit is configured to modulate versions of the test signal onto an RF local oscillator signal using the modulator and to inject the modulated RF local oscillator into the receiver path.

Aspect 14 is the RF device according to anyone of claims 11 to 13, wherein the set of N scaling factors comprises only scaling factors equal to or less than 1.

Aspect 15 is the RF device according to anyone of Aspects 11 to 14, wherein the set of N scaling factors comprises the values $\cos((2\pi \times n)/N)$ where n is an integer number from 0 to N−1.

Aspect 16 is the RF device according to anyone of Aspects 11 to 15, wherein the set of N×M digital samples comprises the digital samples $Y(n,m)$ with n being an integer number from 0 to N−1 and m being an integer from 0 to M−1 and generating Fourier-transformed data comprises calculating Fourier-transformed samples by Fourier-transforming the set of digital samples $Y(n,m)$ along the n-indices.

Aspect 17 is the RF device according to anyone of Aspects 11 to 16, wherein the set of N×M digital samples comprises the digital samples $Y(n,m)$ with n being an integer number from 0 to N−1 and m being an integer from 0 to M−1 and generating Fourier-transformed data comprises calculating a two-dimensional Fourier-Transformation on the set of digital samples $Y(n,m)$.

Aspect 18 is the RF device according to anyone of Aspects 11 to 17, wherein the evaluation circuit is configured to determine the nonlinearity characteristic of the receiver path based on determining peaks of the Fourier-transformed data.

Aspect 19 is the RF device according to Aspect 18, wherein the evaluation device is configured to determine the nonlinearity characteristic of the receiver path based on determining peaks from a set of samples that corresponds to Fourier-transformed samples of an $u^{th}$ harmonic, where u is an integer greater than 1.

Aspect 20 is the RF device according to any of Aspects 11 to 19, wherein the evaluation device is configured to determine the nonlinearity characteristic of the receiver path based on at least one of: determining a third order intercept point; determining a spurious free dynamic range; or determining a total harmonic distortion.

It should be noted that the description and drawings merely illustrate the principles of the proposed methods and systems. Those skilled in the art will be able to implement various arrangements that, although not explicitly described or shown herein, embody the principles of the implementation and are included within its spirit and scope. Furthermore, all aspects and implementations outlined in the present document are principally intended expressly to be only for explanatory purposes to help the reader in understanding the principles of the proposed methods and systems. Furthermore, all statements herein providing principles, aspects, and implementations of the implementation, as well as specific aspects thereof, are intended to encompass equivalents thereof.

The invention claimed is:

1. A method for determining a nonlinearity characteristic of a receiver path, the method comprising:
   generating a set of N×M digital samples by repeating N times:
      selecting a scaling factor from a set of N scaling factors,
      generating a version of a test signal, the version of the test signal corresponding to a test signal scaled by the selected scaling factor,
      processing the version of the test signal in at least a part of the receiver path to generate a processed signal, and
      storing M digital samples corresponding to the processed signal;
   generating Fourier-transformed data using at least a portion of the set of N×M digital samples; and
   determining a nonlinearity characteristic of the receiver path based on the Fourier-transformed data.

2. The method according to claim 1, wherein the test signal comprises a baseband tone or a radio frequency (RF) signal.

3. The method according to claim 1, wherein each of the generated versions of the test signal is modulated onto a radio frequency (RF) local oscillator signal, and wherein the modulated RF local oscillator is injected into the receiver path.

4. The method according to claim 1, wherein the set of N scaling factors comprises only scaling factors equal to or less than 1.

5. The method according to claim 1, wherein the set of N scaling factors comprises the values $\cos((2\pi \times n)/N)$ where n is an integer number from 0 to N−1.

6. The method according to claim 1, wherein the set of N×M digital samples comprises digital samples Y(n,m) with n being an integer number from 0 to N−1 and m being an integer from 0 to M−1, and wherein generating the Fourier-transformed data comprises:
   calculating Fourier-transformed samples by Fourier-transforming the set of digital samples Y(n,m) along n-indices.

7. The method according to claim 1, wherein the set of N×M digital samples comprises digital samples Y(n,m) with n being an integer number from 0 to N−1 and m being an integer from 0 to M−1, and wherein generating the Fourier-transformed data comprises:
   calculating a two-dimensional Fourier-Transformation on the set of digital samples Y (n, m).

8. The method according claim 1, wherein determining the nonlinearity characteristic of the receiver path based on the Fourier-transformed data comprises:
   determining peaks of the Fourier-transformed data.

9. The method according to claim 8, wherein determining the nonlinearity characteristic of the receiver path based on the Fourier-transformed data comprises:
   determining peaks from a set of samples that corresponds to Fourier-transformed samples of an $u^{th}$ harmonic, where u is an integer greater than 1.

10. The method according to claim 1, wherein determining the nonlinearity characteristic of the receiver path comprises at least one of:
    determining a third order intercept point;
    determining a spurious free dynamic range; or
    determining a total harmonic distortion.

11. A radio frequency (RF) device comprising:
    a receiver path;
    circuitry for determining a nonlinearity characteristic of the receiver path, the circuitry comprising:
       a test circuit, the test circuit configured to generate a set of N×M digital samples by repeating N times:
          selecting a scaling factor from a set of N scaling factors,
          generating a version of a test signal, the version of the test signal corresponding to a test signal scaled by the selected scaling factor,
          processing the version of the test signal in at least a part of the receiver path to generate a processed signal, and
          storing M digital samples corresponding to the processed signal; and
       an evaluation circuit, the evaluation circuit configured to generate Fourier-transformed data using at least a portion of the set of N×M digital samples and to determine a nonlinearity characteristic of the receiver path based on the Fourier-transformed data.

12. The RF device according to claim 11, wherein the test signal comprises at least one of a baseband tone or an RF signal.

13. The RF device according to claim 11, wherein the test circuit comprises a modulator and wherein the test circuit is configured to modulate versions of the test signal onto an RF local oscillator signal using the modulator and to inject the modulated RF local oscillator into the receiver path.

14. The RF device according to claim 11, wherein the set of N scaling factors comprises only scaling factors equal to or less than 1.

15. The RF device according to claim 11, wherein the set of N scaling factors comprises the values $\cos((2\pi \times n)/N)$, where n is an integer number from 0 to N−1.

16. The RF device according to claim 11, wherein the set of N×M digital samples comprises digital samples Y(n,m) with n being an integer number from 0 to N−1 and m being an integer from 0 to M−1, and wherein generating the Fourier-transformed data comprises:
    calculating Fourier-transformed samples by Fourier-transforming the set of digital samples Y(n,m) along n-indices.

17. The RF device according to claim 11, wherein the set of N×M digital samples comprises digital samples Y(n,m) with n being an integer number from 0 to N−1 and m being an integer from 0 to M−1, and wherein generating the Fourier-transformed data comprises:
    calculating a two-dimensional Fourier-Transformation on the set of digital samples Y (n, m).

18. The RF device according to claim 11, wherein the evaluation circuit is configured to determine the nonlinearity characteristic of the receiver path based on determining peaks of the Fourier-transformed data.

19. The RF device according to claim 18, wherein the evaluation circuit is configured to determine the nonlinearity characteristic of the receiver path based on determining peaks from a set of samples that corresponds to Fourier-transformed samples of an $u^{th}$ harmonic, where u is an integer greater than 1.

20. The RF device according to claim 11, wherein the evaluation circuit is configured to determine the nonlinearity characteristic of the receiver path based on at least one of:
    determining a third order intercept point;
    determining a spurious free dynamic range; or
    determining a total harmonic distortion.

* * * * *